Patented Jan. 16, 1923.

1,442,341

UNITED STATES PATENT OFFICE.

PAUL HILDEBRANDT, OF HAMBURG, GERMANY, ASSIGNOR, BY MESNE ASSIGNMENTS, TO THE CHEMICAL FOUNDATION, INC., A CORPORATION OF DELAWARE.

PROCESS FOR THE PREPARATION OF HUMAN FOOD FROM HORNS, HAIRS, SKINS, ETC.

No Drawing.   Application filed December 26, 1917. Serial No. 208,865.

*To all whom it may concern:*

Be it known that I, PAUL HILDEBRANDT, citizen of the Empire of Germany, residing at Hamburg, Germany, have invented certain new and useful Improvements in a Process for the Preparation of Human Food from Horn, Hairs, Skins, etc., of which the following is a specification.

In my copending application, Serial Number 208,864, filed Dec. 26, 1917, I described a process for the preparation of albuminous human food products from albuminous animal waste by hydrolysis and mentioned that the products obtained have a nauseous taste unless the animal waste to be hydrolyzed undergoes a special treatment. I mentioned that the compounds which cause that nauseous taste can be removed by boiling with dilute alkaline solutions. Further investigations have shown that such alkaline solutions may be used, as it were, for extracting those objectionable compounds, by applying the alkaline solutions in a dilute state at common temperatures or at slightly increased temperatures. The treatment may be repeated several times whereby the solutions afterwards obtained by hydrolysis in a manner well known become free from any bad taste and smell, so that the pasty products gained after neutralizing and concentrating the solutions yield a meat-like preparation of good taste and pleasant smell.

I have also found, that the same object can be attained even with a better result by first comminuting the raw material and afterwards treating it either with dry heat or with live steam or with hot indifferent gases before the extraction with dilute acid solutions or alkaline solutions is effected.

I will now show by way of example the manner in which my process is carried out in practice:

The comminuted horn mass is heated for some time to a temperature of above 100° C. 100 kilos of the mass thus treated are digested with 200 to 300 litres of a 1% sodium carbonate solution for several hours, the mass being stirred from time to time. The liquor is drained off the solid mass and the latter washed with water. If required, the treatment may be repeated. The albuminoid residue is then free from bad smell and unpleasant taste and can be used either directly as technical albumen or as food for animals.

The mass can be hydrolyzed either by boiling with dilute acids or dilute alkalies until it is dissolved whereupon the solution is neutralized and boiled down preferably in vacuo for the preparation of meat-extract like products of high nutritious value.

It will be understood that the treatment with steam or with dry heat or hot gases is not absolutely necessary and is only effected, if required.

What I claim is:—

1. A process for the preparation of human food from horn, hairs, skins, intestines and other albuminous animal waste consisting in extracting the raw material with several times its volume of dilute alkaline solutions at common temperatures and thereupon hydrolyzing the mass.

2. A process for the preparation of food from albuminous waste which comprises heating the substance to 100° C., extracting with a dilute aqueous solution of sodium carbonate and subsequently hydrolyzing the residue.

3. A process for the preparation of food from albuminous waste which comprises heating the substance to 100° C., extracting with one per cent aqueous sodium carbonate solution and subsequently hydrolyzing the residue.

4. A process for the preparation of food from albuminous waste which comprises extracting albuminous waste with a dilute alkaline solution at a temperature of about 20° C.

In testimony whereof I affix my signature in presence of two witnesses.

PAUL HILDEBRANDT.

Witnesses:
 EDUARD SIEBRAUN,
 WALTER AHRENS.